(12) United States Patent
Kinnison et al.

(10) Patent No.: US 11,628,587 B2
(45) Date of Patent: Apr. 18, 2023

(54) FLOOR SAW WITH BLADE GUARD

(71) Applicant: TECHTRONIC CORDLESS GP, Anderson, SC (US)

(72) Inventors: Andrew Kinnison, Anderson, SC (US); Charles Moody Wacker, II, Anderson, SC (US); Michael R. Hart, Anderson, SC (US); Alejandro Gilson, Anderson, SC (US); Steven P. Hoppa, Greenville, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 17/183,886

(22) Filed: Feb. 24, 2021

(65) Prior Publication Data

US 2022/0266470 A1   Aug. 25, 2022

(51) Int. Cl.
 *B27B 5/30* (2006.01)
 *B23D 45/02* (2006.01)

(52) U.S. Cl.
 CPC .............. *B27B 5/30* (2013.01); *B23D 45/021* (2013.01)

(58) Field of Classification Search
 CPC .... B27B 9/00; B27B 9/02; B27B 9/04; B27B 5/30; B23D 45/021
 See application file for complete search history.

(56) References Cited

U.S. PATENT DOCUMENTS

| | | | |
|---|---|---|---|
| 1,644,326 A | 10/1927 | Crowe | |
| 1,703,179 A | 2/1929 | Skolnik | |
| 2,095,330 A | 10/1937 | Hedgpeth | |
| 2,167,744 A | 6/1938 | Cosby et al. | |
| 2,343,575 A | 3/1944 | Penney | |
| 2,366,017 A | 6/1944 | Fortune | |

(Continued)

FOREIGN PATENT DOCUMENTS

| CN | 1853892 A | 11/2006 |
|---|---|---|
| CN | 205650897 U | 10/2016 |

(Continued)

OTHER PUBLICATIONS

SKIL Operating/Safety Instructions Manual 3601, dated Jun. 21, 2013 (64 pgs.).

(Continued)

*Primary Examiner* — Evan H MacFarlane
*Assistant Examiner* — Fernando A Ayala
(74) *Attorney, Agent, or Firm* — Michael Best & Friedrich LLP (57) ABSTRACT

A powered saw assembly includes a base having a top surface, a column fixed to the top surface, and a guide rail supported above the top surface. The assembly includes a saw unit translatable along the guide rail, the saw unit including a rotating arbor to which a saw blade is attachable for co-rotation therewith. A blade guard at least partially surrounds the saw blade and defines an opening through which the saw blade is movable for attaching or removing the saw blade relative to the arbor. A cover is movably coupled to the blade guard to selectively close the opening. With the cover moved away from the blade guard to expose the opening, the saw blade is attachable or removable relative to the arbor through the opening without passing the saw blade through the slot.

20 Claims, 6 Drawing Sheets

(56) References Cited

U.S. PATENT DOCUMENTS

| | | | |
|---|---|---|---|
| 2,601,878 A | 7/1952 | Anderson | |
| 2,774,191 A | 12/1956 | Bouchez | |
| 2,926,709 A * | 3/1960 | Kaley | B27G 19/02 83/486.1 |
| 3,249,134 A * | 5/1966 | Vogl | B27G 19/02 144/251.1 |
| 3,727,502 A | 4/1973 | Steinman | |
| 3,841,188 A | 10/1974 | Wiater | |
| 3,945,286 A | 3/1976 | Smith | |
| 4,007,657 A | 2/1977 | Burch | |
| 4,163,404 A | 8/1979 | Lavis | |
| 4,378,716 A | 4/1983 | Volk | |
| 4,428,159 A | 1/1984 | Sigetich et al. | |
| 4,660,448 A | 4/1987 | Bies | |
| 4,817,581 A | 4/1989 | Trentadue | |
| 4,869,142 A * | 9/1989 | Sato | B27G 5/02 83/486 |
| 4,995,288 A | 2/1991 | DellaPolla | |
| 5,353,670 A | 10/1994 | Metzger, Jr. | |
| 5,440,815 A | 8/1995 | Inkster | |
| 5,482,026 A | 1/1996 | Russell | |
| 5,647,420 A | 7/1997 | Michell | |
| 5,664,612 A | 9/1997 | Klemma | |
| 5,676,124 A | 10/1997 | Lee | |
| 5,882,155 A | 3/1999 | Testa, Jr. | |
| 6,237,230 B1 * | 5/2001 | Campbell | B23D 59/002 83/478 |
| 6,405,624 B2 | 6/2002 | Sutton | |
| 6,575,067 B2 | 6/2003 | Parks et al. | |
| 6,679,305 B2 | 1/2004 | Petersen | |
| 6,688,202 B2 | 2/2004 | Parks et al. | |
| 6,796,208 B1 * | 9/2004 | Jorgensen | B23Q 11/0046 83/100 |
| 6,971,297 B1 * | 12/2005 | Meredith | B27G 19/02 83/490 |
| D545,849 S | 7/2007 | Lucattini | |
| 7,546,790 B2 | 6/2009 | Parks et al. | |
| 7,946,906 B2 | 5/2011 | Gifford | |
| 8,186,257 B2 | 5/2012 | Heflin et al. | |
| 8,302,518 B2 | 11/2012 | Rybka et al. | |
| 8,424,434 B2 | 4/2013 | Koegel et al. | |
| 8,549,971 B2 | 10/2013 | Rybka et al. | |
| 8,607,679 B2 | 12/2013 | Heflin et al. | |
| 9,027,450 B1 | 5/2015 | Ana | |
| 10,144,143 B2 | 12/2018 | Firth | |
| 10,144,144 B2 | 12/2018 | Firth | |
| 10,363,682 B2 * | 7/2019 | Firth | B27B 5/184 |
| 2001/0001375 A1 * | 5/2001 | Meredith | B27B 27/06 83/471.3 |
| 2002/0104416 A1 | 8/2002 | Brickner, Jr. et al. | |
| 2004/0060178 A1 * | 4/2004 | Willer | B27B 9/00 30/391 |
| 2005/0098010 A1 | 5/2005 | Hu | |
| 2006/0042442 A1 | 3/2006 | Ushiwata et al. | |
| 2006/0053629 A1 | 3/2006 | Martin | |
| 2006/0162171 A1 | 7/2006 | Fuchs et al. | |
| 2006/0218803 A1 | 10/2006 | Zhang | |
| 2008/0047411 A1 | 2/2008 | Cao | |
| 2008/0163492 A1 * | 7/2008 | Johansson | B23D 59/006 30/124 |
| 2008/0216808 A1 * | 9/2008 | O'Banion | B23D 45/027 125/13.01 |
| 2008/0276773 A1 * | 11/2008 | Togare | B23D 45/024 83/581 |
| 2010/0011929 A1 | 1/2010 | Iannelli, Sr. | |
| 2011/0072950 A1 | 3/2011 | Iannelli, Sr. | |
| 2011/0296968 A1 | 12/2011 | Doumani | |
| 2011/0308095 A1 * | 12/2011 | Yoshimura | B27B 9/02 30/377 |
| 2011/0308368 A1 * | 12/2011 | Brown | B27B 27/04 83/471.3 |
| 2012/0006171 A1 * | 1/2012 | Liu | B23D 47/00 83/477.1 |
| 2012/0032382 A1 | 2/2012 | Hendrickson et al. | |
| 2012/0200140 A1 * | 8/2012 | Nagasawa | B28D 7/02 299/39.3 |
| 2017/0021466 A1 * | 1/2017 | Hiroshima | B64F 5/60 |
| 2019/0187397 A1 | 6/2019 | Firth | |
| 2019/0202046 A1 * | 7/2019 | Shibata | B25F 5/02 |

FOREIGN PATENT DOCUMENTS

| | | |
|---|---|---|
| CN | 109318298 A | 2/2019 |
| DE | 2529193 A1 | 1/1977 |
| DE | 3026687 A1 | 2/1982 |
| DE | 3740200 A1 | 6/1989 |
| DE | 29700356 U1 | 4/1997 |
| EP | 1238762 B1 | 9/2002 |
| FR | 1580300 A | 9/1969 |
| FR | 2414391 A1 | 8/1979 |
| FR | 2497533 A1 | 7/1982 |
| FR | 2528348 A1 | 12/1983 |
| FR | 2745737 A1 | 9/1997 |
| FR | 2847844 A1 | 4/2004 |
| GB | 2208071 A | 2/1989 |
| JP | 2017109404 A | 6/2017 |
| TW | 201103673 A | 2/2011 |

OTHER PUBLICATIONS

SKIL Parts List, Table Mitre Saw—F 012 360 100-3601, dated Oct. 1, 2014 (www.powertools-aftersalesservice.com) (6 pgs.).

Extended European Search Report for Application No. 21211018.3 dated May 13, 2022 (9 pages).

* cited by examiner

FLOOR SAW WITH BLADE GUARD

FIELD OF THE DISCLOSURE

The present disclosure relates to power tools, and more particularly to powered floor saws.

BACKGROUND OF THE DISCLOSURE

Floor saws are used to make straight cross, miter, and rip cuts in a work piece. Typically, floor saws are used to cut sheet materials such as wood, plywood, aluminum, steel, tile, and other materials. Some floor saws only permit the saw blade to be removed and replaced through a slot in a base that is aligned with the saw blade, which can be difficult if access to the underside of the base is limited or unavailable.

SUMMARY OF THE DISCLOSURE

The disclosure provides, in one aspect, a powered saw assembly for cutting a work piece. The powered saw assembly comprises a base including a planar top surface on which the work piece to be cut is supported and an opposite bottom surface, and a slot extending from the top surface to the bottom surface. The powered saw assembly also includes a column fixed to the top surface of the base, a guide rail supported above the top surface by the column, and a saw unit translatable along the guide rail relative to the base. The saw unit includes a rotating arbor to which a saw blade is attachable for co-rotation therewith, a blade guard at least partially surrounding the saw blade and defining an opening through which the saw blade is movable for attaching the saw blade to the arbor and removing the saw blade from the arbor, and a cover movably coupled to the blade guard to selective close the opening. With the cover moved away from the blade guard to expose the opening, the saw blade is attachable to the arbor through the opening without passing the saw blade through the slot from the bottom surface of the base toward the top surface. With the cover moved away from the blade guard to expose the opening, the saw blade is removable from the arbor through the opening without passing the saw blade through the slot from the top surface of the base toward the bottom surface.

The disclosure provides, in another independent aspect, a powered saw assembly for cutting a work piece. The powered saw assembly comprises a base including a planar top surface on which the work piece to be cut is supported and an opposite bottom surface, and a slot extending from the top surface to the bottom surface. The powered saw assembly also includes a column fixed to the top surface of the base, a guide rail supported above the top surface by the column, and a saw unit translatable along the guide rail relative to the base. The saw unit includes a rotating arbor to which a saw blade is attachable for co-rotation therewith, a blade guard at least partially surrounding the saw blade and defining an opening through which the saw blade is movable for attaching the saw blade to the arbor and removing the saw blade from the arbor, and a cover pivotably coupled to the blade guard to selective close the opening. With the cover pivoted away from the blade guard to expose the opening, the saw blade is attachable to the arbor through the opening without passing the saw blade through the slot from the bottom surface of the base toward the top surface. With the cover pivoted away from the blade guard to expose the opening, the saw blade is removable from the arbor through the opening without passing the saw blade through the slot from the top surface of the base toward the bottom surface.

Finally, the disclosure provides, in another independent aspect, a powered saw assembly for cutting a work piece. The powered saw assembly comprises a base including a planar top surface on which the work piece to be cut is supported and an opposite bottom surface, and a slot extending from the top surface to the bottom surface. The powered saw assembly also includes a column fixed to the top surface of the base, a guide rail supported above the top surface by the column, and a saw unit translatable along the guide rail relative to the base. The saw unit includes a rotating arbor to which a saw blade is attachable for co-rotation therewith, a blade guard at least partially surrounding the saw blade and defining an opening through which the saw blade is movable for attaching the saw blade to the arbor and removing the saw blade from the arbor, and a cover removably coupled to the blade guard to selective close the opening. With the cover removed from the blade guard to expose the opening, the saw blade is attachable to the arbor through the opening without passing the saw blade through the slot from the bottom surface of the base toward the top surface. With the cover removed from the blade guard to expose the opening, the saw blade is removable from the arbor through the opening without passing the saw blade through the slot from the top surface of the base toward the bottom surface.

Other features and aspects of the disclosure will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
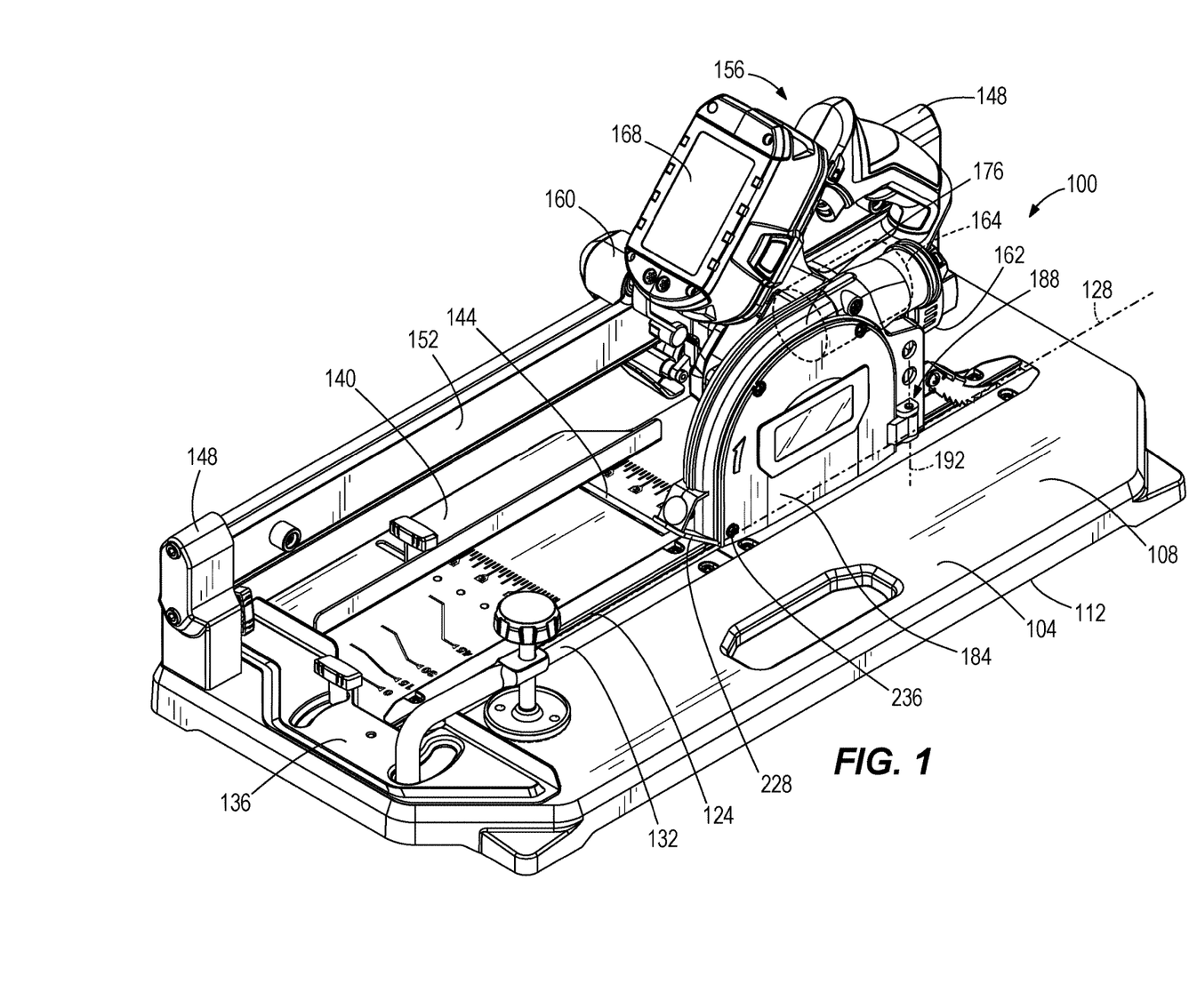
FIG. 1 is a perspective view of a floor saw having a blade guard and cover according to a first embodiment.

FIG. 1 illustrates a powered saw assembly, such as a floor saw 100. The floor saw 100 includes a base 104 having a planar top surface 108 upon which a workpiece to be cut is supported and an opposite bottom surface 112. A slot 124 extends from the top surface 108 to the bottom surface 112 along a longitudinal axis 128. Two columns 148 are fixed to and extend upward from the top surface 108 of the base 104 adjacent, respectively, a front end and a rear end of the base 104. A guide rail 152 is supported above the top surface 108 of the base 104 by the columns 148. The guide rail 152 extends parallel with the longitudinal axis 128, and thus, parallel with the slot 124. As such, a workpiece can be supported on the top surface 108 of the base 104, below the guide rail 152, and between the columns 148.

Auxiliary features of the floor saw 100 include a cross-cut/miter-cut fence 136, a rip-cut fence 140, and a kerf plate 132. The cross-cut/miter-cut fence 136 is adjustable on the base 104 to different angles relative to the longitudinal axis 128. In a cross-cut position, the fence 136 is perpendicular to the longitudinal axis 128 to perform a perpendicular cut of a workpiece abutting the fence 136. In a miter-cut position, the fence 136 is oriented at an oblique angle relative to the longitudinal axis 128 to perform an angled or oblique cut of the workpiece. The rip-cut fence 140 is adjustable on the base 104 in a lateral direction perpendicular to the longitudinal axis 128 to perform rip cuts of a workpiece in a direction along the axis 128. The kerf plate 132 is located between the top surface 108 and the bottom surface 112 of the base 104 adjacent the slot 124. The kerf plate 132 is made from a relatively soft material when compared to the base 104 such as, for example, plastic. The kerf plate 132 inhibits splintering of a workpiece during a cutting operation. Optionally, the kerf plate 132 is removable from the top surface 108 for replacement.

With continued reference to FIG. 1, the floor saw 100 further includes a saw unit 156, which is translatable along the guide rail 152 relative to the base 104. The saw unit 156 includes a carriage 160, a motor housing 162 fixed to the carriage 160, an electric motor 164 positioned within the motor housing 162, and a battery pack 168. The carriage 160 includes rollers (not shown) that interface with the guide rail 152 to facilitate translation of the saw unit 156 along the guide rail 152. The motor 164 receives electrical power from the battery pack 168 to provide torque to an arbor 200 and an attached saw blade 172 (FIG. 2), causing the arbor 200 and saw blade 172 to co-rotate. In operation, the saw unit 156 can be translated along the guide rail 152 and relative to the base 104 to perform a cross-cut or a miter-cut on a work piece. Alternatively, the saw unit 156 can be fixed to the guide rail 152, and the work piece can be translated relative to the base 104 and the rip-cut fence 140 to perform a rip-cut.

Figure 2:
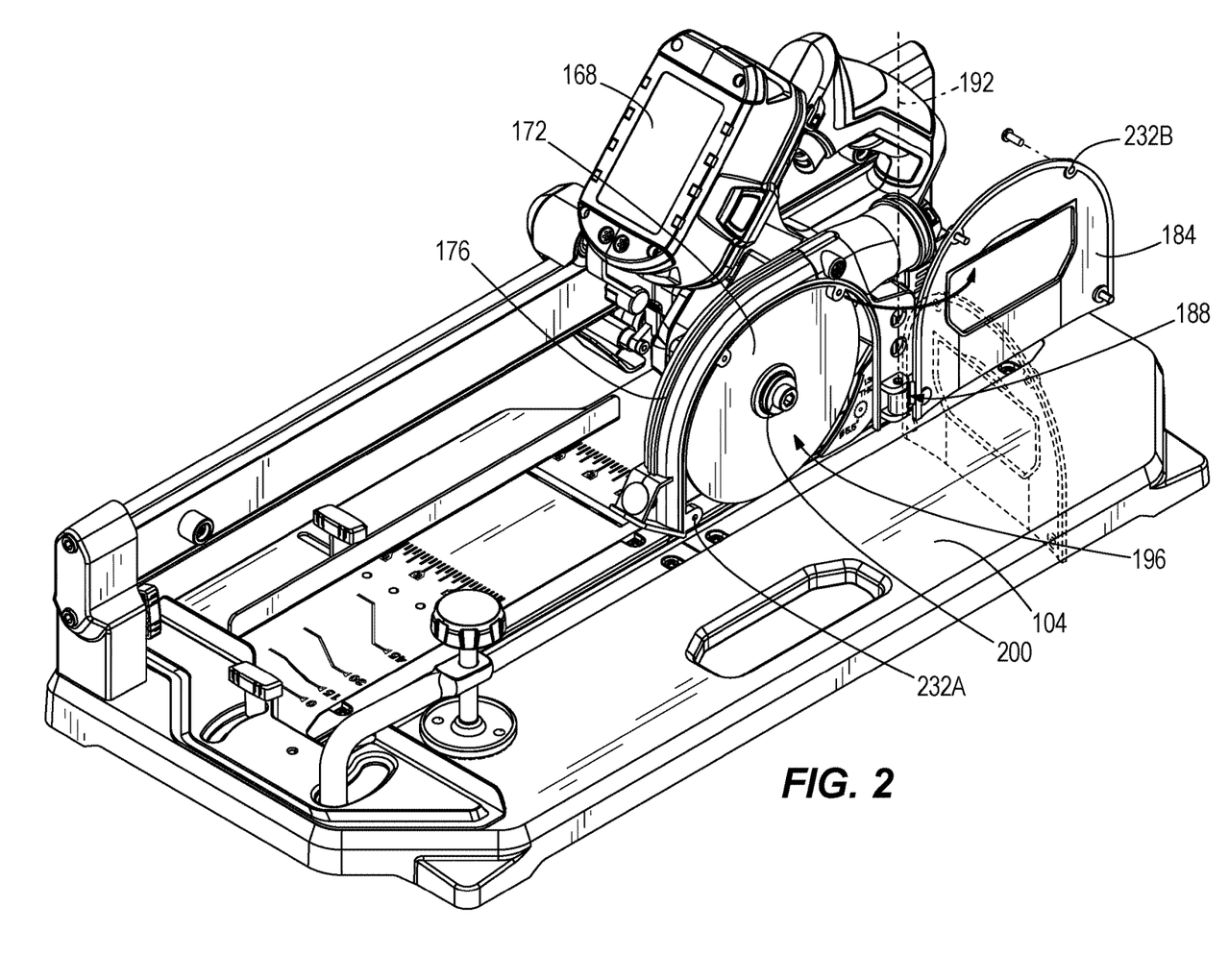
FIG. 2 is a perspective view of the floor saw of FIG. 1 shown with the cover in an open position.

With reference to FIGS. 1 and 2, the saw unit 156 also includes a blade guard 176 partially surrounding the saw blade 172. The blade guard 176 defines an opening 196 through which the saw blade 172 is movable for attaching the saw blade 172 to the arbor 200 and removing the saw blade 172 from the arbor 200. The saw unit 156 further includes a cover 184, which is movably coupled to the blade guard 176 to selectively close the opening 196. In the embodiment of the floor saw 100 shown in FIGS. 1 and 2, the cover 184 is pivotable relative to the blade guard 176 between a closed position in which the opening 196 is closed (FIG. 1), and an open position in which the opening 196 is exposed (FIG. 2). FIG. 2 also illustrates, in broken lines, the cover 184 pivoted to an intermediate position, partially open position between the closed position and the (fully) open position. The cover 184 is located on an opposite lateral side of the blade guard 176 as the guide rail 152. This permits unobstructed access to the cover 184 and, when the cover 184 is in the open position, the saw blade 172 and arbor 200 inside the blade guard 176.

With reference to FIGS. 1 and 2, the saw unit 156 further includes a hinge 188 pivotably coupling the cover 184 to the blade guard 176. The hinge 188 permits the cover 184 to pivot relative to the blade guard 176 between the closed position (FIG. 1) and the open position (FIG. 2). The hinge 188 defines a pivot axis 192 about which the cover 184 pivots relative to the blade guard 176. The pivot axis 192 extends perpendicular to the top surface 108 of the base 104. In the embodiment of the floor saw of FIGS. 1 and 2, the cover 184 is pivotable between the closed position (FIG. 1) and the open position (FIG. 2) without removing the cover 184 from the blade guard 176. In other words, the cover 184 remains attached to the blade guard 176 through the hinge 188 while being pivoted between the closed position (FIG. 1) and the open position (FIG. 2). In some embodiments of the floor saw 100, the hinge 188 may be additionally configured to permit removal of the cover 184 when in the open position.

With the cover 184 pivoted away from the blade guard 176 to expose the opening 196 (as shown in FIG. 2), an "exchange" of the saw blade 172 is permitted without passing the saw blade 172 through the slot 124 in the base 104. An "exchange" involves removing the saw blade 172 from the saw unit 156 and, alternatively, attaching a replacement saw blade 172 to the saw unit 156. With the cover 184 in the open position to expose the opening 196, to remove the saw blade 172, it is first loosened from the arbor 200 (e.g., by removing a bolt) such that the saw blade 172 is no longer attached for co-rotation with the arbor 200. Then, the saw blade 172 is removed from the arbor 200 and passed through the opening 196, without passing the saw blade 172 through the slot 124 (i.e., from the top surface 108 of the base 104 toward the bottom surface 112). Once removed, the original saw blade 172 may be replaced by another saw blade 172. The replacement saw blade 172 may be, for example, a different geometry, a different material, or have different wear characteristics as the original saw blade 172.

The replacement saw blade 172 may be attached to the arbor 200 following a reverse procedure as that described above for removing the original saw blade 172. With the cover 184 pivoted away from the blade guard 176 to expose the opening 196, the replacement saw blade 172 is passed through the opening 196, without passing the saw blade 172 through the slot 124 (i.e., from the bottom surface 112 of the base 104 toward the top surface 108 of the base 104). The replacement saw blade 172 is then attached to the arbor 200 for co-rotation therewith. The cover 184 can then be moved from the open position to the closed position to close the opening 196. Fasteners 236 secure the cover 184 to the blade guard 176 in the closed position (FIG. 1). As shown in FIG. 2, the fasteners 236 engage fastener receivers 232A (e.g., threaded bores) on the blade guard 176 and pass through respective fastener receivers 232B (e.g., unthreaded holes) in the cover 184. In some embodiments of the floor saw 100, quick-release fasteners permanently mounted to the blade guard 176 and/or the cover 184 may secure the cover 184 to the blade guard 176 in the closed position.

Figure 3:
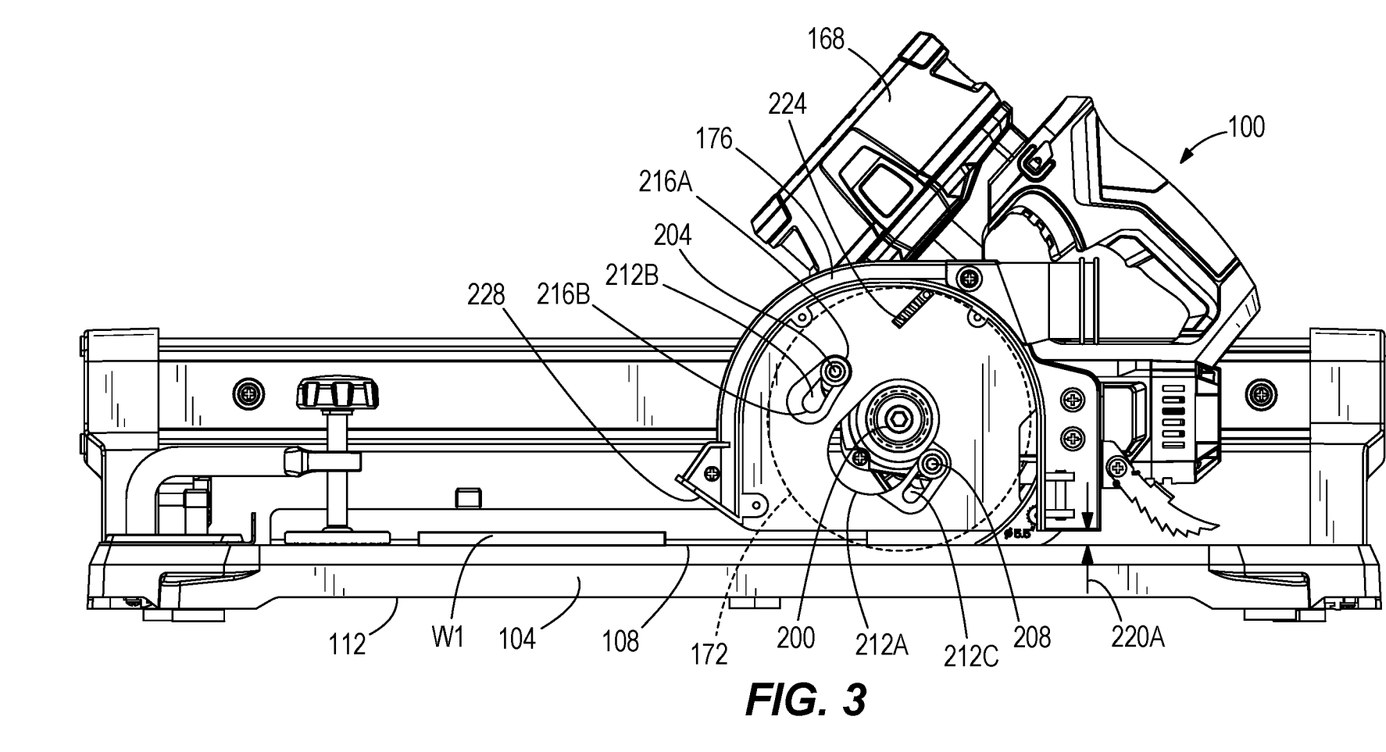
FIG. 3 is a side view of the floor saw of FIG. 1 shown with the cover removed and the blade guard at a first elevation relative to the base.
Figure 4:
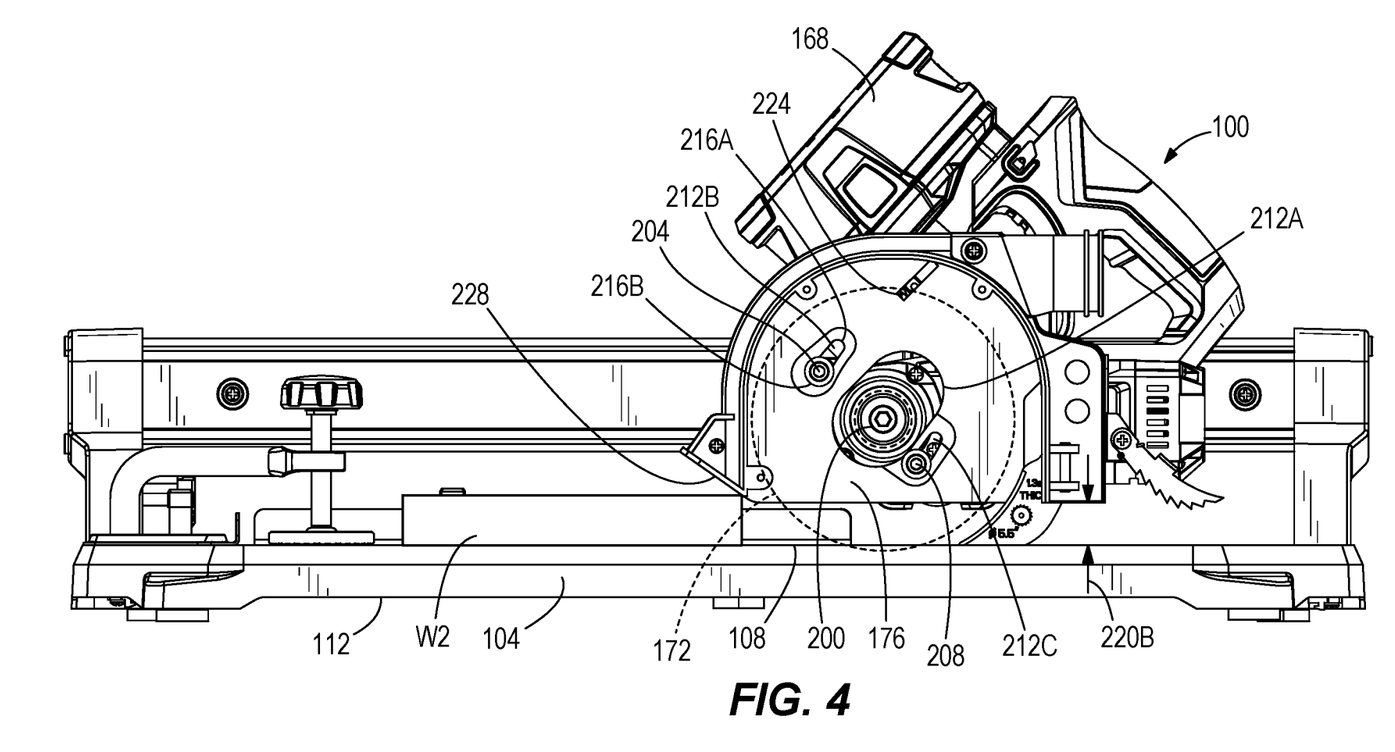
FIG. 4 is a side view of the floor saw of FIG. 1 shown with the cover removed and the blade guard at a second elevation relative to the base.

As shown in FIGS. 3 and 4, which illustrate the floor saw 100 with the cover 184 and the blade 172 removed, the blade guard 176 is movable relative to the base 104 between a lowered position and a raised position during a cutting operation while the elevation of the arbor 200 and saw blade 172 remains unchanged. In FIG. 3, the blade guard 176 is shown in the lowered position with respect to the top surface 108 of the base 104, coinciding with a relatively small elevation gap 220A between the blade guard 176 and the top surface 108. The blade guard 176 may remain in the lowered position while cutting work pieces W1 having a relatively small thickness less than or nominally equal to the gap 220A. In contrast, FIG. 4 illustrates the blade guard 176 in the raised position with a relatively large elevation gap 220B between the blade guard 176 and the top surface 108. The blade guard 176 may be lifted to the raised position while cutting work pieces W2 having a relatively large thickness greater than the gap 220A.

The arbor 200 is positioned within an elongated hole or slot 212A in the blade guard 176. The slot 212A is oriented in an inclined direction extending in an oblique direction away from the top surface 108. Bolts 204, 208 retain the blade guard 176 to the motor housing 162 and are positioned on either side of the arbor 200 within their own respective elongated holes or slots 212B, 212C. The slots 212B, 212C are parallel with the slot 212A, limiting movement of the blade guard 176 to a single degree of freedom when adjusted between the lowered and raised positions. Each slot 212B, 212C has opposite first and second ends 216A, 216B, with the second end 216B being located closer to the top surface 108. When the bolts 204, 208 are located adjacent the first end 216A, the blade guard 176 is in the lowered position (FIG. 3). Conversely, when the bolts 204, 208 are located adjacent the second end 216B, the blade guard 176 is in the raised position (FIG. 4). A spring 224 biases the blade guard 176 from the raised position toward the lowered position.

During a cutting operation, the saw unit 156 is translated along the guide rail 152 or a workpiece W2 is brought into contact with an inclined surface 228 at the front of the blade guard 176. The surface 228 is generally planar and is inclined relative to the top surface 108 in an opposite direction as the slots 212A, 212B, 212C. When the inclined surface 228 comes into contact with the work piece W2, contact between the work piece W2 and the inclined surface 228 imparts a reaction force on the blade guard 176 oriented perpendicular to the inclined surface 228 (and parallel with the slots 212A, 212B, 212C), sliding the blade guard 176 relative to the motor housing 162 in the diagonal direction defined by the slots 212A, 212B, 212C towards the raised position. FIG. 4 illustrates the inclined surface 228 coming into contact with the work piece W2. The blade guard 176 is slid by the inclined surface 228 towards the raised position. This occurs without changing the elevation of the arbor 200 or the saw blade 172 relative to the top surface 108 of the base 104. After the cutting operation is completed and the work piece W2 loses contact with the blade guard 176, the spring 224 rebounds, returning the blade guard 176 to the lowered position shown in FIG. 3.

Figure 5:
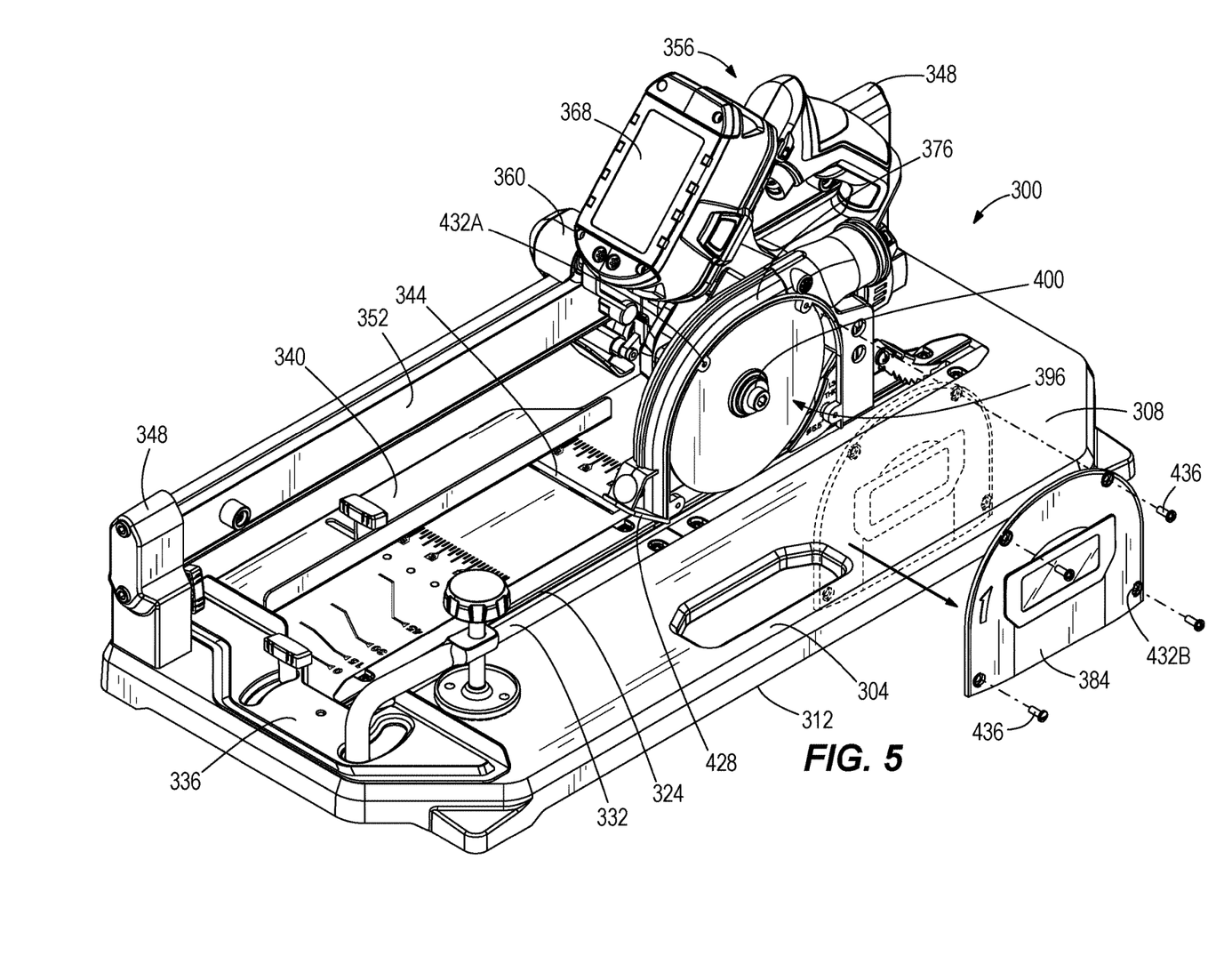
FIG. 5 is a perspective view of a floor saw having a blade guard and cover according to a second embodiment.

FIG. 5 illustrates another embodiment of a floor saw 300, with like features as the floor saw 100 being labeled with reference numerals plus "200." In the floor saw 300, the cover 384 is movable relative to the blade guard 376 by removing the cover 384 from the blade guard 376. Fasteners 436 secure the cover 384 to the blade guard 376 in the closed position. As shown in the exploded view of FIG. 5, the fasteners 436 engage fastener receivers 432A (e.g., threaded bores) on the blade guard 376 and pass through respective fastener receivers 432B (e.g., unthreaded holes) in the cover 384. In some embodiments of the floor saw 300, quick-release fasteners permanently mounted to the blade guard 376 and/or the cover 384 may secure the cover 384 to the blade guard 376 in the closed position.

As described above with respect to the opening 196, with the cover 384 removed from the blade guard 376 to expose the opening 396, the saw blade 372 is attachable to the arbor 400 through the opening 396 without passing the saw blade 372 through the slot 324 from the bottom surface 312 of the base 304 toward the top surface 308. Conversely, with the cover 384 removed from the blade guard 376 to expose the opening 396, the saw blade 372 is removable from the arbor 400 through the opening 396 without passing the saw blade 372 through the slot 324 from the top surface 308 of the base 304 toward the bottom surface 312. In the floor saw 300, the cover 384 is movable between a closed position, in which the cover 384 is attached to the blade guard 376 to close the opening 396, and an open position, in which the cover 384 is removed from the blade guard 376 to expose the opening 396.

Figure 6:
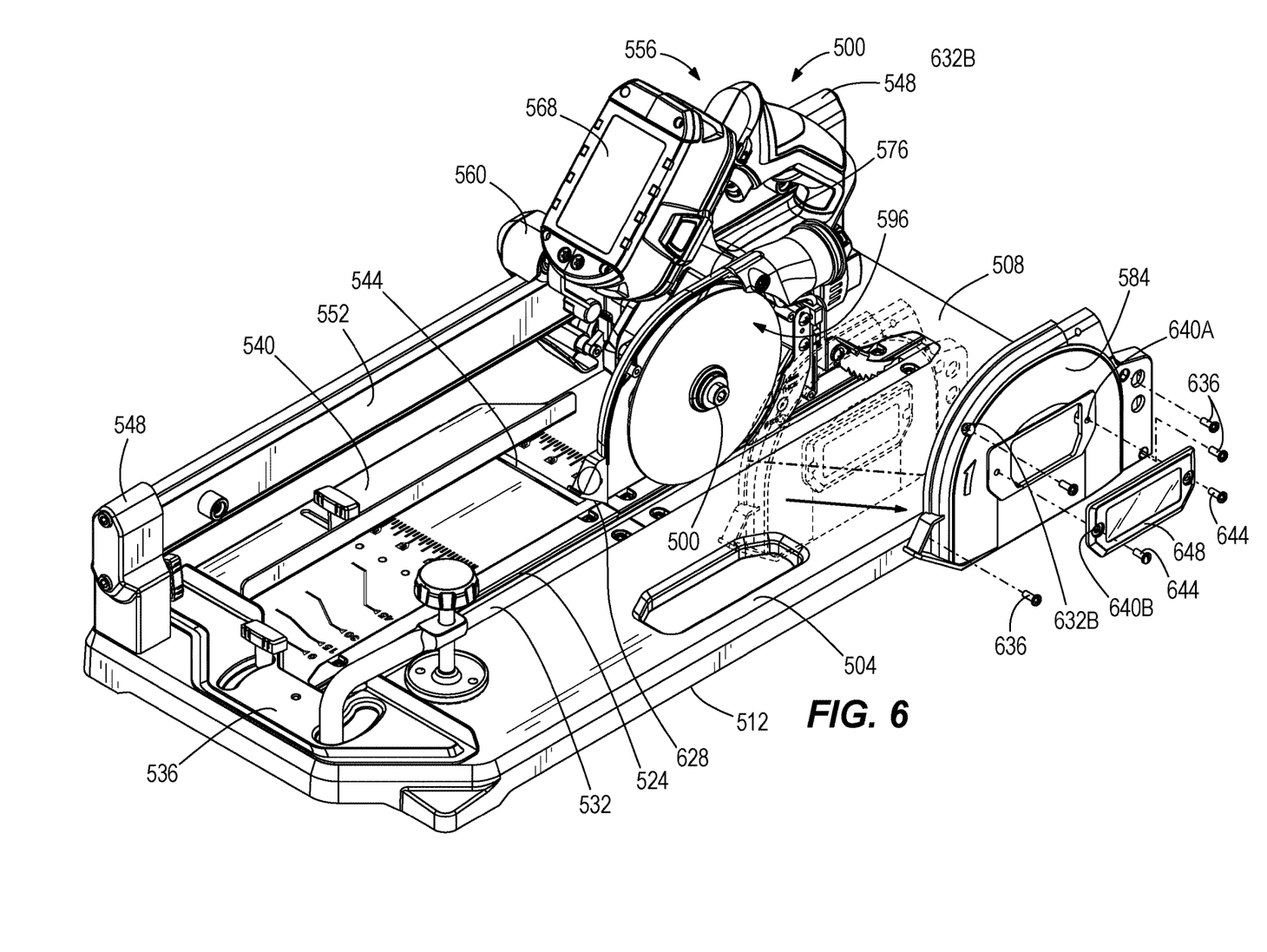
FIG. 6 is a perspective view of a floor saw having a blade guard and cover according to a third embodiment.

FIG. 6 illustrates another embodiment of a floor saw 500, with like features as the floor saw 300 being labeled with reference numerals plus "200." In the floor saw 500, the cover 584 is movable relative to the blade guard 576 by removing the cover 584 from the blade guard 576, in a like manner as the cover 384 shown in FIG. 5. With the cover 584 removed, an opening 596 is formed for conducting a blade exchange therethrough without passing the saw blade 572 through the slot 524 in a similar manner as described above with the floor saw 300.

With continued reference to FIG. 6, the floor saw 500 also includes an access plate 648 removably attached to the cover 584 independent of whether the cover 584 is attached to the blade guard 576. Fasteners 644 secure the access plate 648 to the cover 584 in a closed position. As shown in the exploded view of FIG. 6, the fasteners 644 engage fastener receivers 640A (e.g., threaded bores) on the cover 584 and pass through respective fastener receivers 640B (e.g., unthreaded holes) in the access plate 648. In some embodiments of the floor saw 500, quick-release fasteners permanently mounted to the cover 584 and/or the access plate 648 may secure the access plate 648 to the cover 584 in the closed position. With the fasteners 644 disengaged from the fastener receivers 640A, the access plate 648 may be removed from the cover 584 to provide access to the arbor 600 while the cover 584 is in the closed position relative to the blade guard 576. In some embodiments of the floor saw 500, the access plate 648 may remain attached to the cover 584 when opened (e.g., with a hinge like hinge 188 shown in FIGS. 1 and 2) to provide access to the arbor 600 with the cover 584 in the closed position.

Various features of the invention are set forth in the following claims.

What is claimed is:
1. A powered saw assembly for cutting a work piece, the assembly comprising:
   a base including
      a planar top surface on which the work piece to be cut is supported and an opposite bottom surface, and
      a slot extending from the top surface to the bottom surface;
   a column fixed to the top surface of the base;
   a guide rail supported above the top surface by the column; and
   a saw unit translatable along the guide rail relative to the base, the saw unit including
      a rotating arbor to which a saw blade is attachable for co-rotation therewith,
      a blade guard at least partially surrounding the saw blade and defining an opening through which the saw blade is movable for attaching the saw blade to the arbor and removing the saw blade from the arbor,
      a cover movably coupled to the blade guard to selectively close the opening;
      a motor housing; and
      an electric motor positioned within the motor housing and operably coupled to the arbor to provide torque thereto, causing the arbor to rotate, wherein, with the cover moved away from the blade guard to expose the opening, the saw blade is attachable to the arbor through the opening without passing the saw blade through the slot from the bottom surface of the base toward the top surface wherein, with the cover moved away from the blade guard to expose the opening, the saw blade is removable from the arbor through the opening without passing the saw blade through the slot from the top surface of the base toward the bottom surface, wherein the blade guard is slidable relative to the motor housing in a linear diagonal direction away from the top surface of the base, and wherein during a cutting operation and without changing an elevation of the arbor relative to the top surface of the base, the blade guard is slidable relative to the motor housing between a lowered position and a raised position relative to the top surface of the base.

2. The powered saw assembly of claim 1, wherein the cover is movable between a closed position in which the cover is attached to the blade guard and an open position in which the opening is exposed without removing the cover from the blade guard.

3. The powered saw assembly of claim 1, further comprising fasteners securing the cover to the blade guard in the closed position.

4. The powered saw assembly of claim 1, wherein the blade guard includes an elongated slot oriented in an inclined direction extending away from the top surface of the base, and at least a portion of the arbor is positioned within the elongated slot.

5. The powered saw assembly of claim 4, further comprising a bolt retaining the blade guard to the motor housing, wherein the blade guard includes a second elongated slot oriented parallel to the elongated slot, and at least a portion of the bolt is positioned within the second elongated slot to limit movement of the blade guard to a single degree of freedom when adjusted between the lowered position and the raised position.

6. The powered saw assembly of claim 4, further comprising a battery pack to provide electrical power to the electric motor.

7. The powered saw assembly of claim 1, wherein the guide rail is in facing relationship with a first lateral side of the blade guard, and wherein the cover is positioned on an opposite, second lateral side of the blade guard as the guide rail.

8. A powered saw assembly for cutting a work piece, the assembly comprising:
 a base including
  a planar top surface on which the work piece to be cut is supported and an opposite bottom surface, and
  a slot extending from the top surface to the bottom surface;
 a column fixed to the top surface of the base;
 a guide rail supported above the top surface by the column; and
 a saw unit translatable along the guide rail relative to the base, the saw unit including
  a rotating arbor to which a saw blade is attachable for co-rotation therewith,
  a blade guard at least partially surrounding the saw blade and defining an opening through which the saw blade is movable for attaching the saw blade to the arbor and removing the saw blade from the arbor,
  a cover pivotably coupled to the blade guard to selectively close the opening;
  a motor housing; and
  an electric motor positioned within the motor housing and operably coupled to the arbor to provide torque thereto, causing the arbor to rotate,
 wherein, with the cover pivoted away from the blade guard to expose the opening, the saw blade is attachable to the arbor through the opening without passing the saw blade through the slot from the bottom surface of the base toward the top surface
 wherein, with the cover pivoted away from the blade guard to expose the opening, the saw blade is removable from the arbor through the opening without passing the saw blade through the slot from the top surface of the base toward the bottom surface,
 wherein the blade guard is slidable relative to the motor housing in a linear diagonal direction away from the top surface of the base, and
 wherein during a cutting operation and without changing an elevation of the arbor relative to the top surface of the base, the blade guard is slidable relative to the motor housing between a lowered position and a raised position relative to the top surface of the base.

9. The powered saw assembly of claim 8, wherein the cover is pivotable between a closed position in which the cover is attached to the blade guard and an open position in which the opening is exposed without removing the cover from the blade guard.

10. The powered saw assembly of claim 9, further comprising a hinge coupling the cover and the blade guard, permitting the cover to pivot relative to the blade guard between the closed position and the open position.

11. The powered saw assembly of claim 10, wherein the hinge defines a pivot axis about which the cover pivots relative to the blade guard, and wherein the pivot axis extends perpendicular to the top surface of the base.

12. The powered saw assembly of claim 9, further comprising fasteners securing the cover to the blade guard in the closed position.

13. The powered saw assembly of claim 8, wherein the blade guard includes an elongated slot oriented in an inclined direction extending away from the top surface of the base, and at least a portion of the arbor is positioned within the elongated slot.

14. The powered saw assembly of claim 13, further comprising a bolt retaining the blade guard to the motor housing, wherein the blade guard includes a second elongated slot oriented parallel to the elongated slot, and at least a portion of the bolt is positioned within the second elongated slot to limit movement of the blade guard to a single degree of freedom when adjusted between the lowered position and the raised position.

15. The powered saw assembly of claim 13, further comprising a battery pack to provide electrical power to the electric motor.

16. The powered saw assembly of claim 8, wherein the guide rail is in facing relationship with a first lateral side of the blade guard, and wherein the cover is positioned on an opposite, second lateral side of the blade guard as the guide rail.

17. A powered saw assembly for cutting a work piece, the assembly comprising:
 a base including
  a planar top surface on which the work piece to be cut is supported and an opposite bottom surface, and a slot extending from the top surface to the bottom surface;

a column fixed to the top surface of the base;

a guide rail supported above the top surface by the column; and a saw unit translatable along the guide rail relative to the base, the saw unit including a rotating arbor to which a saw blade is attachable for co-rotation therewith, a blade guard at least partially surrounding the saw blade and defining an opening through which the saw blade is movable for attaching the saw blade to the arbor and removing the saw blade from the arbor, and a cover removably coupled to the blade guard to selectively close the opening;

wherein, with the cover removed from the blade guard to expose the opening, the saw blade is attachable to the arbor through the opening without passing the saw blade through the slot from the bottom surface of the base toward the top surface, wherein, with the cover removed from the blade guard to expose the opening, the saw blade is removable from the arbor through the opening without passing the saw blade through the slot from the top surface of the base toward the bottom surface, wherein the blade guard is slidable relative to the motor housing in a linear diagonal direction away from the top surface of the base, and wherein during a cutting operation and without changing an elevation of the arbor relative to the top surface of the base, the blade guard is slidable relative to the motor housing between a lowered position and a raised position relative to the top surface of the base.

18. The powered saw assembly of claim 17, wherein the cover is movable between a closed position in which the cover is attached to the blade guard and an open position in which the cover is removed from the blade guard and the opening is exposed.

19. The powered saw assembly of claim 18, further comprising fasteners securing the cover to the blade guard in the closed position.

20. The powered saw assembly of claim 18, further comprising an access plate movably coupled to the cover to selectively provide access to the arbor while the cover remains in the closed position.

* * * * *